July 22, 1969     H. A. BELLER     3,456,766

DUAL-NETWORK WHEEL-BRAKE ARRANGEMENT

Filed Dec. 14, 1967     2 Sheets-Sheet 1

INVENTOR,
HANS A. BELLER

BY *Karl G. Ross*

ATTORNEY

July 22, 1969  H. A. BELLER  3,456,766
DUAL-NETWORK WHEEL-BRAKE ARRANGEMENT
Filed Dec. 14, 1967  2 Sheets-Sheet 2

INVENTOR,
HANS A. BELLER
BY
Karl F. Ross
ATTORNEY

United States Patent Office 3,456,766
Patented July 22, 1969

3,456,766
DUAL-NETWORK WHEEL-BRAKE
ARRANGEMENT
Hans Albert Beller, Bad Vilbel, Germany, assignor to Alfred Teves GmbH., Frankfurt am Main, Germany, a corporation of Germany
Filed Dec. 14, 1967, Ser. No. 690,489
Claims priority, application Germany, Dec. 16, 1966, T 32,767
Int. Cl. B60t 11/20
U.S. Cl. 188—152                         6 Claims

ABSTRACT OF THE DISCLOSURE

A vehicle-brake system having tandem or twin-master cylinder for delivering brake fluid to independent transmission networks, each connected with one compartment of a disk brake having a pair of actuating cylinders located adjacent one another on one side of the brake disk and receiving a respective piston. The pistons, also located side by side, transfer force directly to a common brakeshoe on this side of the disk while reaction force is applied via a frame extending along a sector of the disk, a movable yoke or like force-transmission member to a brakeshoe disposed on the other side of the disk.

---

My present invention relates to a dual-network wheel-brake arrangement and, more particularly, to an assembly in which disk-type brakes remain operable even in the event of failure of one of the fluid-transmission networks.

In the commonly assigned copending application Ser. No. 681,330, filed Nov. 8, 1967 by myself together with Helmut Marschall, Wolfgang Kammermayer, Heinz Hahm and Juan Belart it is pointed out that dual-network brake systems, because of increased safety, have gained in interest in recent years and have even been required in many areas. The term "dual-network brake system" as used in that application and herein, is intended to designate a brake system for automotive vehicles in which the master cylinder is subdivided into a pair of independent chambers, each of which may communicate with a respective compartment of a brake fluid reservoir and receives a respective master-cylinder piston operated by the brake pedal of the vehicle. In tandem master cylinders, the master cylinder chambers are disposed one behind the other and the coaxially aligned but axially spaced pistons received in these chambers can be coupled by rods, springs or other force-transmitting systems. From each of the master-cylinder chambers, a respective fluid-transmission network of tubes or lines runs to the respective set of wheel-brake cylinders. In general, earlier systems using dual-transmission networks have connected the master-cylinder chambers with respective sets of wheel-brake cylinders. Thus, if the vehicle is equipped with front-wheel brakes and rear-wheel brakes, one transmission network communicates with all of the wheel-brake cylinders of the front-wheel brakes while the other transmission network commuicates with all the wheel-brake cylinders of the rear-wheel brakes. Systems using tandem-master cylinders (or twin-master cylinders in which the chambers and compartments are side by side) have the advantage over single-network brakes that a failure in one of the net-works because of defective seals in the related wheel-brake cylinders or master cylinder compartment, breakage of a transmission line or a defect in the connecting fittings will not prevent the other network from applying the respective set of wheel brakes. It is self-understood that a system of this nature is incapable of providing the same brake effectiveness when failure eliminates one of the networks. When either the front or rear-wheel brake is alone active, difficulties are encountered in stopping the vehicle within the necessary distance and in maintaining the vehicle on a straight course.

To avoid this disadvantage, it has been proposed to provide a wheel-brake cylinder on each side of the brake disk in a disk-brake system and to connect one cylinder of each wheel brake to one network and the other cylinder of each wheel brake to the other network. This arrangement, too, has the disadvantage that nonuniform braking results in the failure of one of the networks. In other systems, the stroke of the piston remaining effective in each wheel brake is doubled upon failure of one of the networks thereby increasing the stroke of the master-cylinder piston and creating difficulties with respect to the response of the vehicle operator.

In the aforementioned copending application, a system is described which avoids some or all of these disadvantanges and yet is able to obtain the safety features of dual-network brakes without the increased cost that would be required by simply duplicating the wheel brakes or providing four wheel-brake cylinders at each wheel brake. Another significant disadvantage of arrangements of the latter type, now rendered obsolete by the system disclosed in the copending application is that a substantial increase in the weight of the wheel brake is almost inevitable. It is recognized by vehicle designers and engineers that an increase in the mass below the suspension is undesirable for smoothness of travel and oscillation-damping qualities. Accordingly, it is important to maintain the wheel brake as small as possible and as light as is consistent with the function the brake must perform.

It is, therefore, the principal object of the present invention to provide an improved disk brake for automotive vehicles which extend the principles originally set forth in the aforementioned copending application and yet avoids the disadvantages of earlier dual-network disk brakes.

Another object of this invention is to provide an improved dual-network brake system for automotive vehicles which is of reduced cost and complexity by comparison with earlier systems.

Still another object of this invention is to provide a compact, low-mass disk brake which forms part of a dual network system and yet does not diminish the area of frictional engagement with the disk or increase the stroke of the master cylinder upon failure of one of the networks.

Yet another object of this invention is to provide a segmental disk rake for dual-network hydraulic operation which requires relatively little space, is easily mounted and dismounted in the vehicle and permits a wide range of choice as to the volume and pressure characteristics of the brake system and as to the volume and pressure distribution between the networks, without creating difficulties upon failure of one of the networks.

I have found that a substantial improvement over the relatively complicated systems proposed heretofore can be obtained when the disk brake, which is actuated by a dual-network master cylinder, comprises a housing extending around the periphery of the brake disk and provided only on one side of the latter with the hydraulic actuating means in the form of a pair of independent cylinders in side-by-side relationship; these cylinders, which are connected with the hydraulic networks individually behind their respective pistons, bear directly upon a common brakeshoe while force-transmitting means applied the hydraulic reaction force of both cylinders to a single brakeshoe on the other side of the disk. The tensionable force-transmitting member may be a movable brake yoke of the floating or swingable type described in the aforementioned copending application; it may be mounted by a parallelogrammatic linkage on the axle housing which normally supports the stationary part of the brake housing; or it may be a frame lying in a plane perpendicular to the plane of the disk and intersecting the latter along a secant. The frame also may be of the floating or swingable type or may have a parallelogrammatic linkage connecting it with the axle housing.

According to a more specific feature of this invention, the force-transmitting member, whether formed by the movable yoke or a frame, is advantageously guided in a stationary member such as an auxiliary yoke in which the main yoke is shiftable (see the prior application) or a yoke whose guide structure for the frame is integral with the cylinder housing. The auxiliary yoke in each case acts to constrain the force-transmitting member against rotatable entrainment by the disk, the brakeshoes being similarly prevented by the auxiliary yoke from moving with the disk. The pressure chambers of the cylinders are preferably disposed on the side of the piston turned away from the disk and, moreover, each guide surface of the piston is provided with only a single sealing ring close to its end proximal to the disk and farthest from the hydraulic-pressure chamber of the wheel-brake cylinder.

The above and otoher objects, features and advantages of the present invention will become more readily apparent from hte following description, reference being made to the accompanying drawing, in which.

Figure 1:
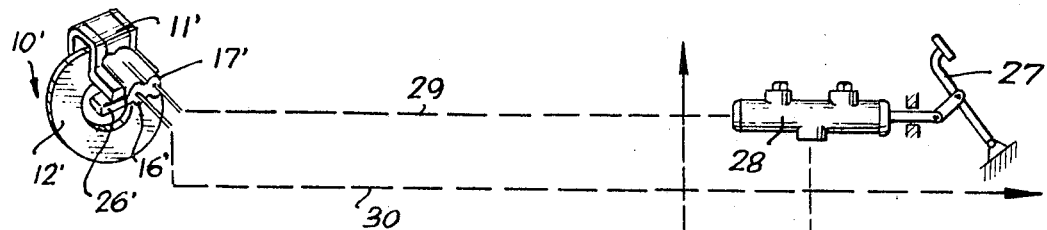
FIG. 1 is an axial cross-sectional view, taken in a horizontal plane of a wheel-brake system embodying the present invention and showing other parts of the system in diagrammatic form.
Figure 1:
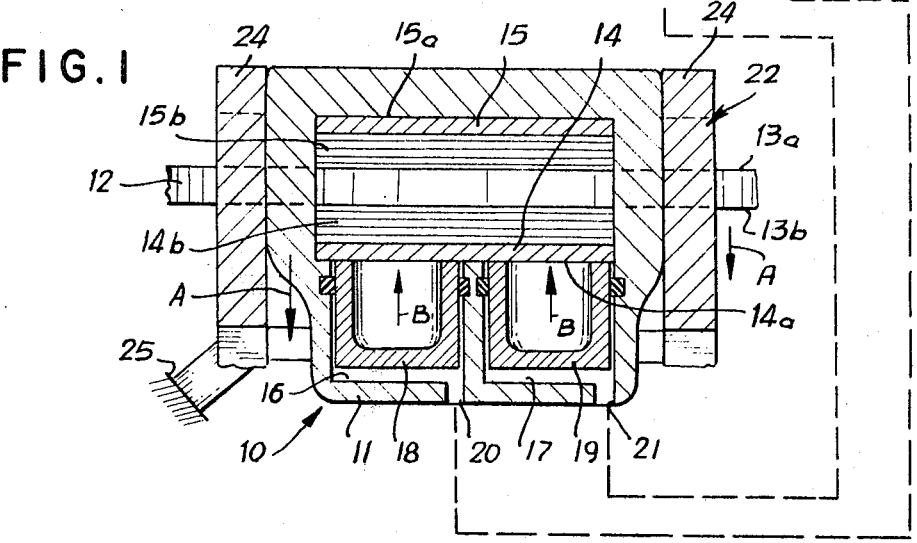

In FIG. 1, I show a disk-brake arrangement for an automotive vehicle which has a plurality of wheel brakes, one of which is shown in detail at 10. As here illustrated, the wheel brake comprises a brake yoke 11 which reaches around the periphery of a disk 12 and is generally of U-shape configuration as is represented at 11' for the brake 10' whose disk is designated 12'. The disk 12 has a pair of annular braking faces 13a and 13b which are respectively juxtaposed with brakeshoes 14 and 15. Each brakeshoe has a backing plate 14a, 15a to which is bonded a brake lining 14b, 15b, the latter being frictionally engageable with the disk to reduce the speed of the latter when the wheel brake is applied. At only one side of the disk 12, the yoke 11 is provided wtih the wheel-brake cylinders 16, 17 which receive respective cup-shaped pistons 18 and 19; the latter bear together against the single backing plate 14a of the proximal brakeshoe 14. Hydraulic fluid is supplied to the cylinders 16 and 17 at the respective pressure chambers behind this piston via ports 20 and 21. Thus, hydraulic fluid is delivered to the cylinder along a side of the piston opposite the disk 12. The yoke 11 is shiftable in the direction of arrows A and can be a floating or swingable yoke or may be mounted upon a parallelogrammatic linkage as described hereinafter in connection with FIG. 3. The pistons 18 and 19, however, are driven by hydraulic fluid in the direction of arrows B to apply the brakeshoe 14 against the disk 12. The reaction force thus applied to yoke 11 draws the brakeshoe 15 against the disk. It will be apparent that any failure in one of the networks will nevertheless leave both brake surfaces fully operative when the other network responds.

Figure 2:
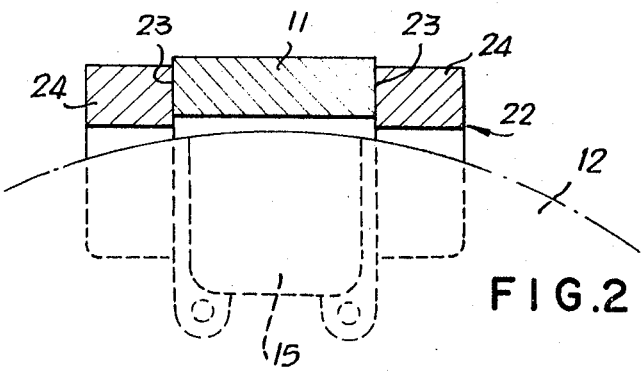
FIG. 2 is a cross-sectional view showing the relationship between the auxiliary yoke and the force-transmitting yoke.

In this embodiment, the yoke 11 is shiftable in the direction of arrow A within an auxiliarly yoke 22 which also reaches around the periphery of the disk and constrains the yoke 11 against rotatable entrainment with the disk. The auxiliary yoke 22 is shown in part in FIG. 2, from which it can be seen that the flanks 23 of yoke 11 are directly engaged by the bars 24 of the yoke 22. The yoke 22 is mounted upon the axle housing of the vehicle as represented at 25 by a flange 16', for example, when the disk 12 is driven by the shaft passing through the axle housing. The auxiliary yoke is further described in the aforementioned copending application.

The dual-network brake system comprises, moreover, a brake pedal 27 of the usual construction which operates a tandem-master cylinder 28 to supply brake fluid to a network 29 delivering fluid to the cylinder 16, 16' of the wheel brakes and a further hydraulic network 30 delivering fluid to the wheel-brake cylinders 17, 17', etc.

Figure 3:
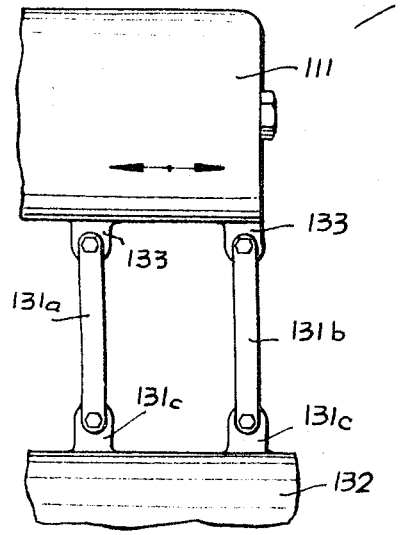
FIG. 3 is a fragmentary elevational view showing another system for mounting the movable yoke.

Another system for movably supporting the yoke 11 is illustrated in FIG. 3. In this embodiment, the yoke, here designated 111, is provided with the side-by-side wheel-brake cylinders and pistons on only one side of the disk and has a parallelogrammatic linkage 131 supporting the yoke upon the axle housing 132. The parallelogrammatic linkage comprises a pair of links 131a and 131b which are pivotally secured to lugs 131c on the axle housing 132 and to lugs 133 integral with the cylinder housing of the yoke 111. It will be apparent that the movement of the yoke 111 is permitted in the direction of arrows C and that such movement is a combination of swinging and floating movement as previously described.

Figure 4:
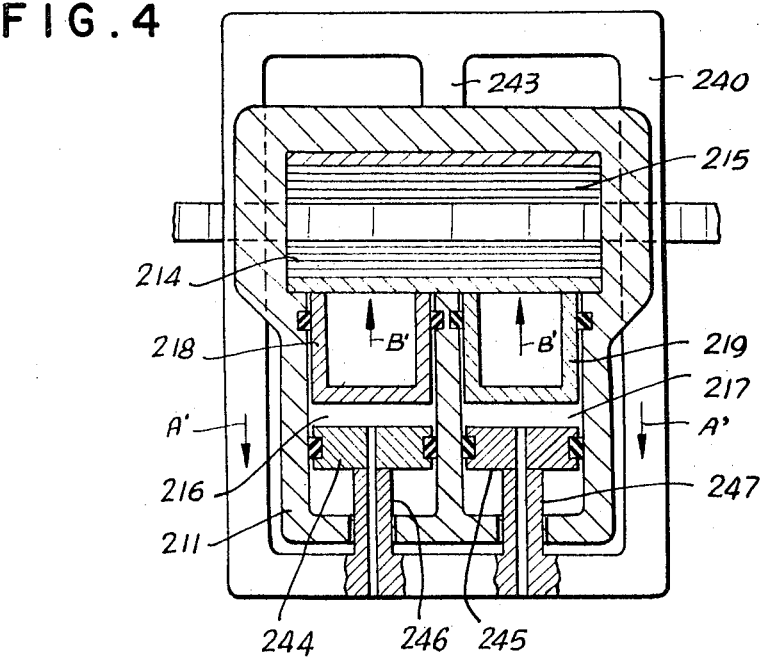
FIG. 4 is a view similar to FIG. 1, wherein the force-transmitting member is a frame.
Figure 5:
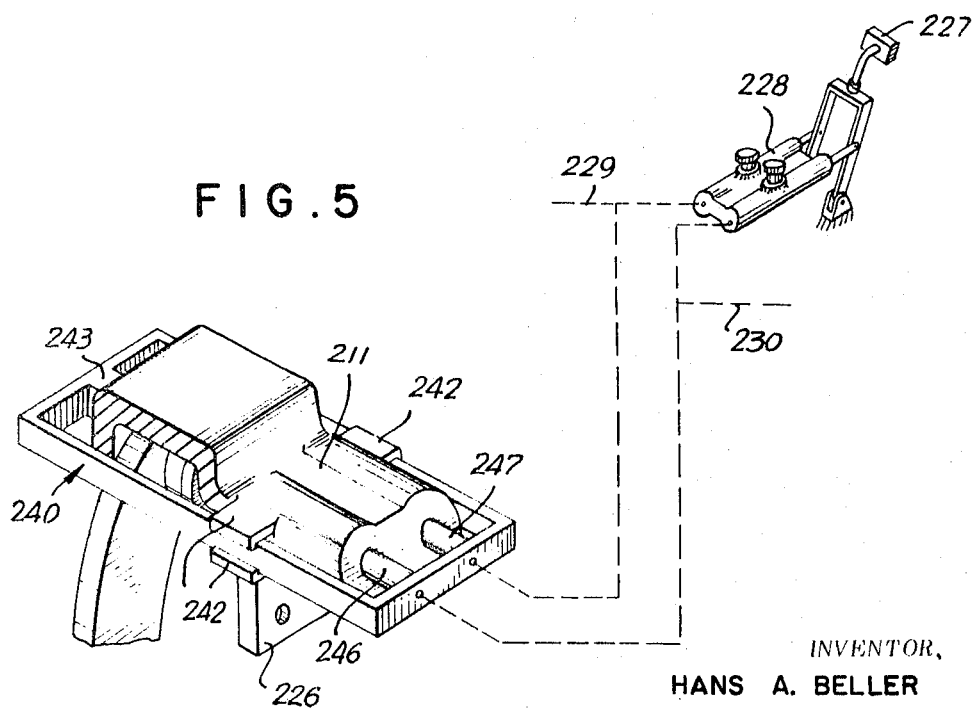
FIG. 5 is a perspective view of this embodiment.

Another embodiment of the present invention is shown in FIGS. 4 and 5 wherein the yoke 211 is fixed to the housing, e.g. by a flange 226 while the force-transmitting means is constituted by a frame 240. The frame 240 is, as can be seen from FIG. 5, guided between pair of lugs 242 integral with the cylinder structure of the yoke 211 for movement in the direction of arrow A'. To this end, the frame 240 bears upon the distal brakeshoe 215 via a projection 243 and receives reaction force from the cylinders 216 and 217 via pistons 244 and 245 which act upon the projections 246 and 247 of the frame 240. Hydraulic fluid is delivered to the cylinders 216 and 217 through the projections 246 and 247 to displace the pistons 218 and 219 in the direction of arrows B' to apply the brakeshoes 214 directly against the disk. Hydraulic fluid is delivered to the cylinders 216 and 217 by a twin-master cylinder 228 which is operated by the brake pedal 227 and delivers fluid to the networks 229 and 230. This brake of course operates in the manner previously described.

The invention described and illustrated is believed to admit of many modifications within the ability of persons skilled in the art.

I claim:

1. A vehicle-brake system comprising dual-compartment master-cylinder means for displacing at least two independent brake-fluid streams, a pair of transmission networks each connected to one of said compartments for transmission of the brake fluid displaced from said compartments, and at least one disk brake pressurizable by both said networks, said disk brake including a rotatable brake disk, a fixed support having a pair of guide members extending transversely of said disk and across the latter, a nonrotatable housing slidable between said members and reaching around the periphery of said disk, a respective single brakeshoe flanking each face of said disk, said brakeshoes each having a lining engageable with said disk and a backing plate carrying the respective lining, one of said brakeshoes being movable toward said disk relative to said housing, the other brakeshoe being fixed on said housing, a pair of hydraulically energizable wheel-brake cylinders side by side in said housing on the side of the disk corresponding to said one of said brakeshoes with parallel axes, respective piston axially shiftable in the respective wheel-brake cylinders and both acting directly against the backing plate of the single brakeshoe on said side of said disk, said housing receiving reaction force from both cylinders and transmitting said reaction force to the other brakeshoe to draw the same against said disk, said wheel-brake cylinders being respectively connected to said transmission networks.

2. The brake system defined in claim 1 wherein said transmission networks are respectively connected to said cylinders on a side of said pistons remote from said disk.

3. The brake system defined in claim 2 wherein each of said cylinders and the respective piston are provided with annular seal means at the end of the piston proximal to said disk.

4. A vehicle-brake system comprising dual-compartment master-cylinder means for displacing at least two independent brake-fluid streams, a pair of transmission networks each connected to one of said compartments for transmission of the brake fluid displaced from said compartments, and at least one disk brake pressurizable by both said networks, said disk brake including a rotatable brake disk, a nonrotatable housing reaching about the periphery of said disk and nonrotatable with respect to the latter, a pair of brakeshoes each flanking a respective side of said disk and mounted in said housing for movement toward said disk, means forming a pair of hydraulically energizable wheel-brake cylinders in said housing on one side of said disk in side-by-side relationship with parallel axes, said cylinder having open ends turned in the direction of one of said brakeshoes, a pair of first pistons respectively received in said cylinder and both engageable with one of said brakeshoes, said first pistons being axially shiftable in said cylinders, a pair of second pistons respectively received in said cylinders and defining therein hydraulically pressurizable compartments between the first and second pistons of each cylinder, said second pistons being axially shiftable in said cylinder, a frame extending around said housing and bearing upon the other of said brakeshoes while being guided on said housing for movement parallel to said pistons, respective members engaging said second piston and extending axially from said cylinders and connected with said frame for applying reaction force to the latter upon pressurization of said cylinder between said first and second pistons jointly to draw said other brakeshoe against said disk, and means forming respective passages communicating between said compartments and the respective networks.

5. The brake system defined in claim 4 wherein said passages extend through said second pistons and the respective members.

6. The brake system defined in claim 5 wherein said cylinders are provided with annular seal means engaging the respective first pistons at ends thereof proximal to said disk.

References Cited

UNITED STATES PATENTS

| | | | |
|---|---|---|---|
| 2,955,679 | 10/1960 | Herbert | 188—73 X |
| 3,166,156 | 1/1965 | Burnett et al. | 188—73 |
| 3,245,500 | 4/1966 | Hambling et al. | 188—73 |
| 3,371,749 | 3/1968 | Lucien et al. | 188—106 X |

FOREIGN PATENTS

| | | |
|---|---|---|
| 1,095,494 | 12/1954 | France. |
| 1,342,684 | 9/1963 | France. |
| 771,422 | 4/1957 | Great Britain. |

OTHER REFERENCES

German printed application 1,157,445 (1963).

GEORGE E. A. HALVOSA, Primary Examiner

U.S. Cl. X.R.

188—106